(12) United States Patent
Sakai et al.

(10) Patent No.: US 10,845,794 B2
(45) Date of Patent: Nov. 24, 2020

(54) STATE IDENTIFICATION DEVICE, STATE IDENTIFICATION METHOD AND MECHANICAL DEVICE

(71) Applicant: HITACHI, LTD., Tokyo (JP)

(72) Inventors: Hideo Sakai, Tokyo (JP); Masaaki Maeda, Tokyo (JP); Yuichi Sakurai, Tokyo (JP); Masayoshi Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/382,900

(22) Filed: Apr. 12, 2019

(65) Prior Publication Data

US 2019/0324428 A1 Oct. 24, 2019

(30) Foreign Application Priority Data

Apr. 20, 2018 (JP) ................. 2018-081288

(51) Int. Cl.
*G05B 23/02* (2006.01)
*G05B 19/18* (2006.01)
(Continued)

(52) U.S. Cl.
CPC .......... *G05B 23/0283* (2013.01); *E02F 9/264* (2013.01); *G05B 19/188* (2013.01);
(Continued)

(58) Field of Classification Search
CPC . G06Q 10/06; G06Q 10/20; E02F 3/32; E02F 9/264; E02F 9/267; E02F 9/268;
(Continued)

(56) References Cited

U.S. PATENT DOCUMENTS 6,708,138 B1 * 3/2004 Zhang .................... G01B 21/04
702/182
7,513,070 B2 * 4/2009 Ogura ...................... G07C 3/08
172/2
(Continued)

FOREIGN PATENT DOCUMENTS

EP 1927830 A2 6/2008
EP 2431951 A2 3/2012
(Continued)

OTHER PUBLICATIONS

Extended European Search Report dated Sep. 23, 2019 for the European Patent Application No. 19167129.6.

*Primary Examiner* — Crystal J Barnes-Bullock
(74) *Attorney, Agent, or Firm* — Volpe Koenig (57) ABSTRACT

A state identification device includes: a feature amount extraction unit that extracts a feature amount from physical data of a machine tool unit which shifts to a plurality of operation states; a feature amount storage unit in which a region is provided as a storage destination of the extracted feature amount for each of the plurality of operation states to which the machine tool unit shifts; a similarity calculation unit that calculates a similarity between the extracted feature amount and a feature amount stored in the feature amount storage unit; a state determination unit that determines an operation state of the machine tool unit based on the calculated similarity; and a storage destination determination unit that determines the region serving as the storage destination of the extracted feature amount based on a determination result of the state determination unit.

10 Claims, 7 Drawing Sheets

(51) Int. Cl.
 *G05B 19/418* (2006.01)
 *E02F 9/26* (2006.01)
(52) U.S. Cl.
 CPC ..... *G05B 19/4183* (2013.01); *G05B 23/0281* (2013.01); *G05B 2219/24053* (2013.01); *G05B 2219/33285* (2013.01); *G05B 2219/35086* (2013.01)
(58) Field of Classification Search
 CPC .............. G05B 23/0283; G05B 19/188; G05B 19/4183; G05B 2219/24053; G05B 2219/33285; G05B 2219/35086; G05B 23/0281
 See application file for complete search history.

(56) References Cited

U.S. PATENT DOCUMENTS

| | | | |
|---|---|---|---|
| 8,532,865 B2 * | 9/2013 | Suzuki | E02F 9/2054 701/29.1 |
| 10,165,053 B2 * | 12/2018 | Fujiwara | H04L 67/06 |
| 10,322,527 B2 * | 6/2019 | Manabe | B29B 7/283 |
| 10,528,898 B2 * | 1/2020 | Kimura | G07C 3/08 |
| 10,620,036 B2 * | 4/2020 | Yamada | G01H 1/00 |
| 2004/0004540 A1 * | 1/2004 | Komatsu | B60R 25/24 340/426.18 |
| 2005/0010434 A1 * | 1/2005 | Sasajima | G06Q 10/20 705/305 |
| 2012/0041575 A1 | 2/2012 | Maeda et al. | |
| 2018/0033079 A1 * | 2/2018 | Porter | G06N 5/04 |
| 2018/0094635 A1 * | 4/2018 | Ding | F04D 27/02 |
| 2018/0231969 A1 | 8/2018 | Noda et al. | |
| 2018/0299870 A1 * | 10/2018 | Lo | G05B 19/41805 |

FOREIGN PATENT DOCUMENTS

| | | | | |
|---|---|---|---|---|
| JP | 2007316853 A | * | 12/2007 | |
| JP | 2009-169556 A | | 7/2009 | |
| JP | 2016031643 A | * | 3/2016 | ........... G05B 19/406 |
| JP | 2017048046 A | * | 3/2017 | ........ G05B 23/0283 |
| WO | 2017/022783 A1 | | 2/2017 | |
| WO | 2017/090098 A1 | | 6/2017 | |

* cited by examiner

STATE IDENTIFICATION DEVICE, STATE IDENTIFICATION METHOD AND MECHANICAL DEVICE

TECHNICAL FIELD

The present invention relates to a state identification device, a state identification method, and a mechanical device.

BACKGROUND ART

Various existing proposals are made to acquire an operation state of a machine tool, determine maintenance timing based on an acquired operation result, and realize cost reduction in each process.

With respect to acquisition of an operation state of a machine tool, for example, Patent Literature 1 discloses a tracing system which can reliably detect an operation abnormality from a machine robot serving as the machine tool. In the tracing system, "a portable measurement device 10 includes: a geomagnetism sensor 11; an acceleration sensor 12; a data processing unit 13 that samples data from each sensor; and a transmission unit 14 that wirelessly transmits sampling data, and a trace data processing device 20 includes: a receiving unit 21 that wirelessly receives the sampling data from the transmission unit 14; a feature extraction unit 22 that extracts a feature amount based on the sampling data; a standard data storage unit 23 that stores the feature amount in a referential standard state as standard data; a reference unit 24 that compares output data from the feature extraction unit 22 with the standard data stored in the standard data storage unit 23; and a determination unit 25 that determines suitability of a trace result based on a reference result of the reference unit 24".

PRIOR ART LITERATURE

Patent Literature

PTL 1: JP-A-2009-169556

SUMMARY OF INVENTION

Technical Problem

In the tracing system described in Patent Literature 1, the sampling data from each sensor and the previously-created standard data are compared. Accordingly, it is necessary to create learning data in advance again to maintain accuracy of state identification when an operation state of another machine robot or processing device is acquired and a new process is introduced.

Instead of creating the learning data in advance, a method of updating learning data by using an identification result obtained by actually performing state identification is also conceivable. In this case, when there is an upper limit on the number of pieces of the learning data, deviation may occur in the updated learning data when the same state continues to generate the same identification result, and identification accuracy of the operation state may not be maintained.

The invention is made in view of such a situation, and an object of the invention is to maintain state identification accuracy of a machine tool or the like at a high level.

Solution to Problem

The present application includes a plurality of methods that solves at least a part of the above-mentioned problem, and an example of the plurality of methods is as follows. In order to solve the above problem, a state identification device according to an aspect of the invention includes: a feature amount extraction unit that extracts a feature amount from physical data of a machine tool unit which shifts to a plurality of operation states; a feature amount storage unit in which a region is provided as a storage destination of the extracted feature amount for each of the plurality of operation states to which the machine tool unit shifts; a similarity calculation unit that calculates a similarity between the extracted feature amount and a feature amount stored in the feature amount storage unit; a state determination unit that determines an operation state of the machine tool unit based on the calculated similarity; and a storage destination determination unit that determines the region serving as the storage destination of the extracted feature amount based on a determination result of the state determination unit.

Advantageous Effect

According to the invention, state identification accuracy of a machine tool or the like can be maintained at a high level.

Problems, configurations, and effects other than the above will become apparent from description of embodiments below.

DESCRIPTION OF EMBODIMENTS

In one embodiment to be described below, description may be divided into a plurality of sections or embodiments if necessary for convenience. Unless particularly demonstrated, these embodiments are not independent of each other, but in a relationship in which one embodiment is a variation, detailed description, supplementary description, or the like of a part or all of another embodiment. In one embodiment, when the number and the like (including the number of article, a numeric value, a quantity, a range and the like) of an element is referred to, these parameters are not limited to specific numbers, and values may be greater or less than these specific numbers, unless otherwise specified or unless the specific numbers are clearly limited to specific numbers in principle.

In one embodiment, it is needless to say that constituent elements (including element steps and the like) are not always essential, unless specifically indicated or unless clearly considered to be essential in principle. Similarly, in each of the embodiments, when shapes, positional relations, or the like of the constituent elements or the like are mentioned, substantially approximate and similar shapes or the like are included, unless specifically demonstrated or apparently excluded in principle. The same also applies to the numeric value and the range described above. In all the drawings for explaining each of the embodiments, in principle, the same members are denoted by the same reference numerals, and repetitive descriptions thereof will be omitted.

Embodiments of the invention will be described below with reference to the drawings.

<Configuration Example of Production Management System>

Figure 1:
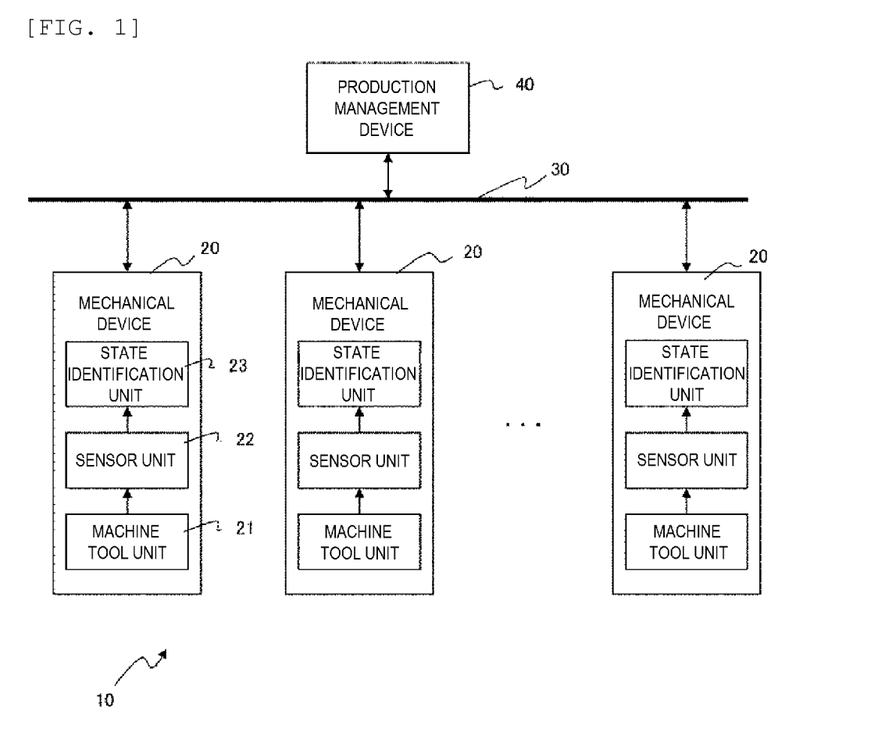
FIG. 1 is a block diagram showing a configuration example of a production management system.

FIG. 1 shows a configuration example of a production management system including a mechanical device according to an embodiment of the invention.

A production management system 10 visualizes operation rates of a plurality of mechanical devices 20 disposed in a factory, for example.

In the production management system 10, the plurality of mechanical devices 20 are connected to a production management device 40 via a network 30.

Each mechanical device 20 includes a machine tool unit 21, a sensor unit 22, and a state identification unit 23.

The machine tool unit 21 includes, for example, a lathe, a milling machine, and a robot that cuts or polishes a material such as metal. The machine tool unit 21 can shift to at least one of three types of operation states: a stop state, an idle state, and a work state.

The stop state refers to a state in which the machine tool unit 21 is stopped. The idle state refers to a state in which the machine tool unit 21 stands by for immediately starting work such as cutting. The work state refers to a state in which the machine tool unit 21 is actually working such as cutting.

The operating state of the machine tool unit 21 is not limited to the three types described above. The machine tool unit 21 may also be configured to shift between two or four or more types of operation states.

The sensor unit 22 detects physical data of the machine tool unit 21. Here, the physical data may be data that can change in accordance with the operation state of the machine tool unit 21, such as current consumption, vibration, rotation, volume, and sound quality. The sensor unit 22 outputs the detected physical data to the state identification unit 23.

The state identification unit 23 (corresponding to the state identification device of the invention) extracts a feature amount of the physical data input from the sensor unit 22, and identifies the operation state of the machine tool unit 21 (hereinafter, also referred to as the operation state of the mechanical device 20) based on the extracted feature amount. The state identification unit 23 notifies the production management device 40 of the operation state of the identified mechanical device 20 via the network 30.

Several hundreds of sensor units 22 are required when operation states of all the mechanical devices 20 installed in a factory or the like are visualized. Since a number of state identification units 23 are also required according to the number of mechanical devices 20, it is conceivable to use a relatively inexpensive edge microcomputer to realize the state identification unit 23 for cost reduction. However, since the edge microcomputer has an upper limit on the number of data that can be processed or held at the same time, it is necessary to pay attention to these points when the state identification is performed in real time.

The network 30 includes, for example, a local area network (LAN), a wide area network (WAN). The network 30 may be configured by a wired network, or by using a predetermined wireless communication standard.

The production management device 40 calculates an operation rate of each mechanical device 20, and plans maintenance timing and efficient operation of the mechanical device 20 based on an operation state identification result notified from each mechanical device 20 via the network 30.

<First Configuration Example of State Identification Unit 23>

Figure 2:
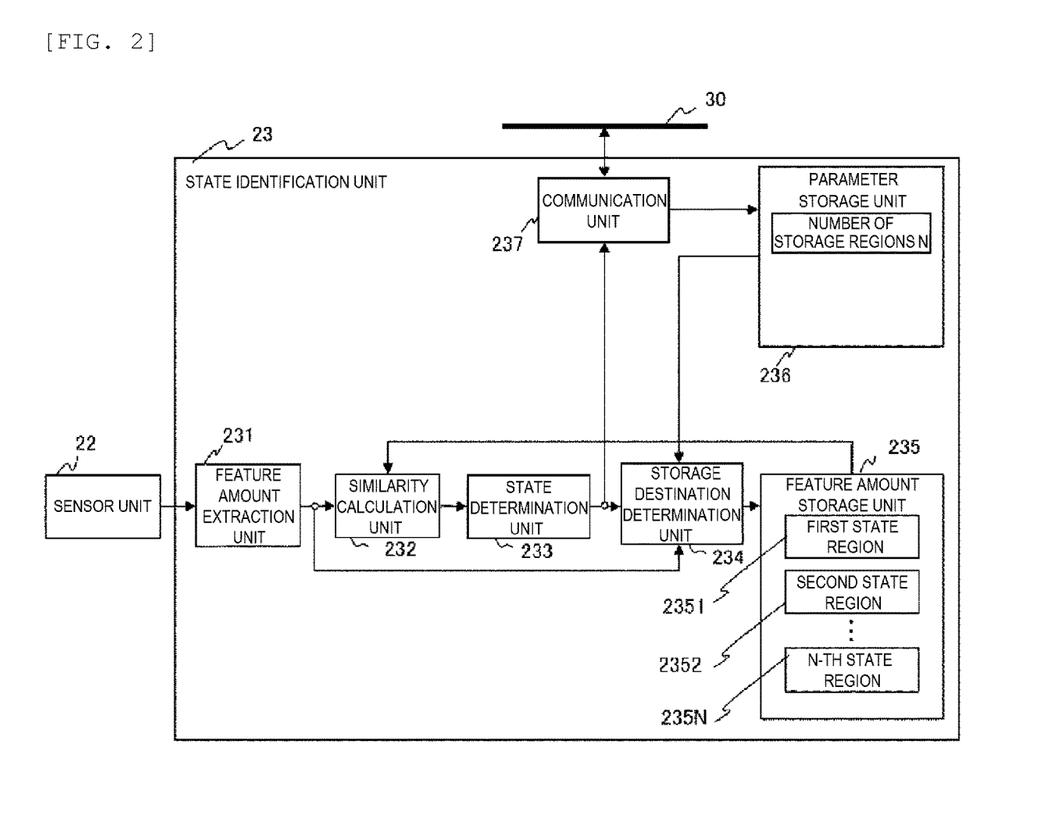
FIG. 2 is a block diagram showing a first configuration example of a state identification unit.

Next, FIG. 2 shows a first configuration example of the state identification unit 23.

The first configuration example of the state identification unit 23 includes a feature amount extraction unit 231, a similarity calculation unit 232, a state determination unit 233, a storage destination determination unit 234, a feature amount storage unit 235, a parameter storage unit 236, and a communication unit 237.

The feature amount extraction unit 231 extracts a feature amount from the physical data input from the sensor unit 22 and outputs the feature amount to the similarity calculation unit 232. Specifically, for example, the feature amount extraction unit 231 performs fast Fourier transform (FFT) for each fixed section with respect to sequentially input physical data (for example, a current value). Then inner products of amplitude values of each frequency component and a main component vector, which are obtained as a result of the transform, are calculated, so that a dimension of the feature amount is limited to a three-dimensional degree as a first main component value, a second main component value, a third main component value . . . of the feature amount in descending order of the inner products.

In addition to the method described above, a method using a wavelet transform, a method using a factor analysis, or the like may be adopted as the feature amount extraction method.

The feature amount extraction unit 231 outputs the extracted feature amount to the similarity calculation unit 232 and the storage destination determination unit 234.

Figure 3:
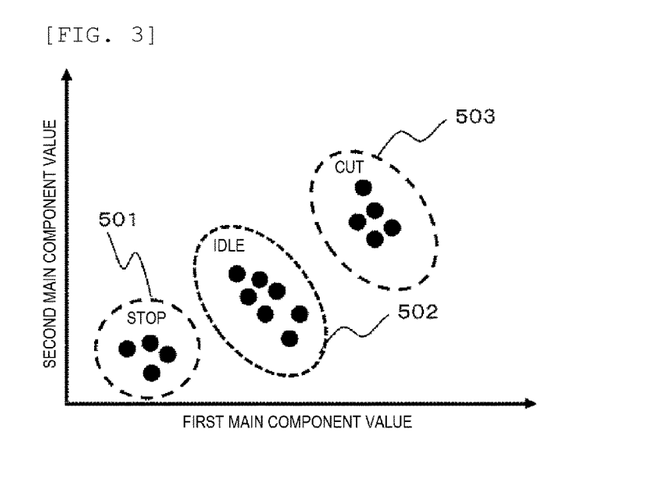
FIG. 3 shows an example of a feature amount space.

FIG. 3 shows an example of a feature amount distribution chart when a feature amount extracted by the feature amount extraction unit 231 is plotted in a feature amount space. FIG. 3 shows a two-dimensional feature amount space in which a horizontal axis represents a first main component value, and a vertical axis represents a second main component value.

As shown in the figure, the feature amount is gathered for each operation state and is distributed in the feature amount space.

A broken line region 501 shows distribution of a feature amount corresponding to the stop state, a broken line region 502 shows distribution of a feature amount corresponding to the idle state, and a broken line region 503 shows distribution of a feature amount corresponding to the work state.

FIG. 2 will again be referred to. The similarity calculation unit 232 calculates a similarity between all feature amounts already stored in the feature amount storage unit 235 and the feature amount input from the feature amount extraction unit 231. The calculated similarity has a larger value as a similarity degree increases. The similarity calculation unit 232 outputs the calculated similarity to the state determination unit 233.

The state determination unit 233 compares the calculated similarity with a preset threshold value, and determines whether the operation state of the mechanical device 20 is the stop state, the idle state, or the work state based on a comparison result. Details of the operation state determination method will be described below.

The state determination unit 233 outputs an operation state determination result to the storage destination determination unit 234 and the communication unit 237.

The storage destination determination unit 234 determines a storage destination in the feature amount storage unit 235 for the feature amount input from the feature amount extraction unit 231 based on the operation state determination result of the state determination unit 233, and stores the feature amount in the determined storage destination.

The feature amount storage unit 235 is provided with the same number of regions as a number of storage regions N previously stored in the parameter storage unit 236. In the present embodiment, the number of storage regions N is three, which is the same as the number of operation states to which the mechanical device 20 can shift. Therefore, the feature amount storage unit 235 is provided with a first state region 2351, a second state region 2352, and a third state region 2353.

The feature amount corresponding to the stop state is stored in the first state region 2351 up to a predetermined upper limit number M1. Hereinafter, the feature amount corresponding to the stop state stored in the first state region 2351 is also referred to as basic data. The feature amount corresponding to the idle state is stored in the second state region 2352 up to a predetermined upper limit number M2. The feature amount corresponding to the work state is stored in the third state region 2353 up to a predetermined upper limit number M3.

As described above, the storage region number N is stored in advance in the parameter storage unit 236. The parameter storage unit 236 may also store the upper limit numbers M1, M2, M3 of feature amounts stored in each of the first state region 2351, the second state region 2352, and the third state region 2353, respectively. The upper limit numbers M1, M2, M3 of the feature amounts stored in each region of the feature amount storage unit 235 may be the same or different. For example, if the upper limit number M2 or the upper limit number M3 is set to a value larger than the upper limit number M1, determination accuracy of the idle state or the work state can be improved. The parameter storage unit 236 may also store a total number of the upper limit numbers of the feature amount stored in each region of the feature amount storage unit 235 (M1+M2+M3).

Parameters such as the number of storage regions N stored in the parameter storage unit 236 may be changed by the production management device 40 via the network 30.

The communication unit 237 is connected to the production management device 40 via the network 30, and notifies the operation state determination result of the mechanical device 20. In this way, by notifying the operation state determination result, the communication unit 237 can reduce a data communication amount in the network 30 as compared with a case where physical data and a feature amount of the physical data are notified. Processing load of the production management device 40 can be reduced as compared with a case where an operation state is determined in the production management device 40 based on the physical data of each mechanical device 20 and the feature amount of the physical data.

<State Identification Processing of Mechanical Device 20>

Figure 4:
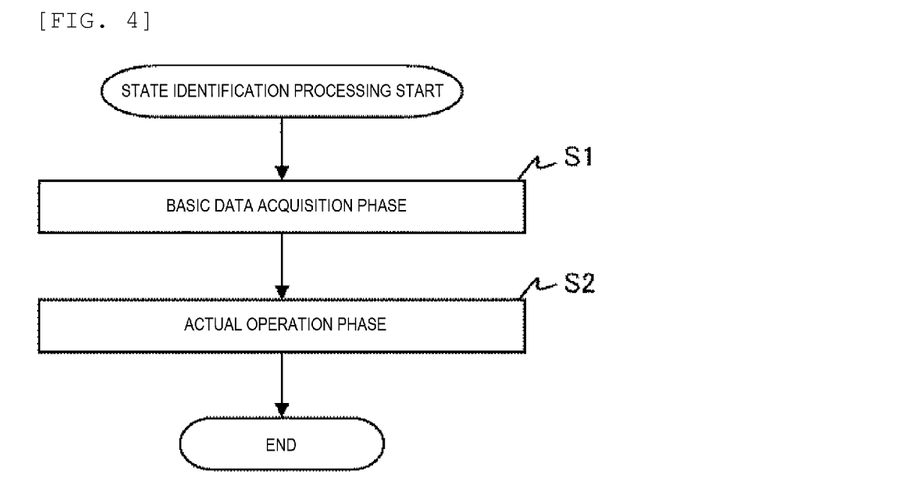
FIG. 4 is a flowchart showing an example of a state identification processing.

Next, FIG. 4 is a flowchart showing an example of a state identification processing of the mechanical device 20.

The state identification processing includes: a basic data acquisition phase (step S1) of acquiring and storing the feature amount in the stop state; and an actual operation phase (step S2) of actually operating the machine tool unit 21 to identify an operation state.

Figure 5:
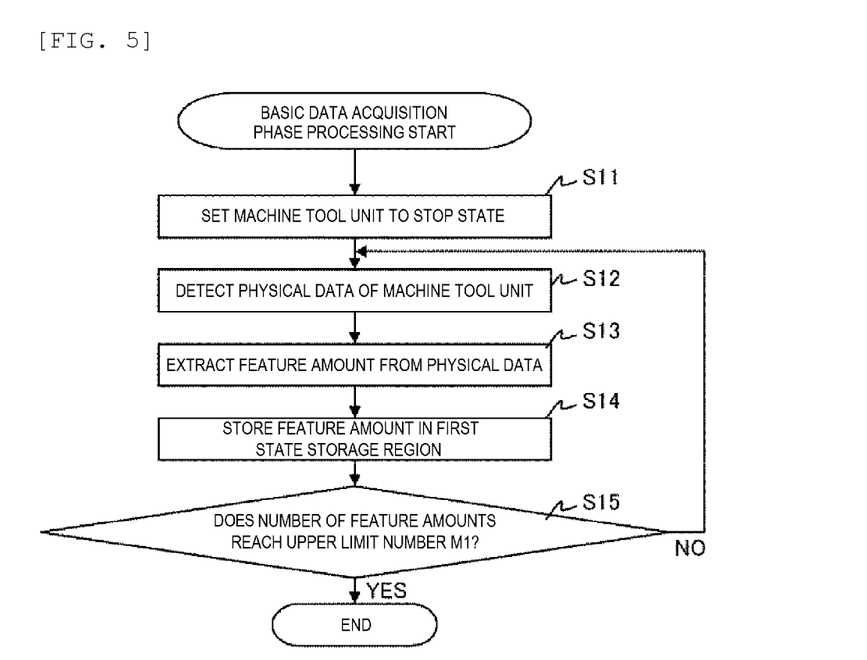
FIG. 5 is a flowchart showing an example of processing of a basic data acquisition phase.

FIG. 5 is a flowchart showing an example of processing of the basic data acquisition phase in step S1.

The processing of the basic data acquisition phase is executed at least once prior to processing of the actual operation phase described below, and is started in response to a predetermined operation from a user.

First, the mechanical device 20 sets the machine tool unit 21 to the stop state (step S11). Next, the sensor unit 22 detects physical data of the machine tool unit 21 and outputs the detected physical data to the state identification unit 23 (step S12).

Next, the feature amount extraction unit 231 of the state identification unit 23 extracts a feature amount from the physical data input from the sensor unit 22, and outputs the extracted feature amount to the storage destination determination unit 234 (step S13).

Next, the storage destination determination unit 234 determines a storage destination in the feature amount storage unit 235 for the feature amount input from the feature amount extraction unit 231, and stores the feature amount in the determined storage destination. Since the operation state is fixed to the stop state in the basic data acquisition phase, the storage destination is determined to be the first state region 2351, and the feature amount input from the feature amount extraction unit 231 is stored as basic data (step S14).

Next, the storage destination determination unit 234 determines whether the number of feature amounts stored in the first state region 2351 of the feature amount storage unit 235 has reached the upper limit number M1 (step S15). The processing returns to step S12 when the storage destination determination unit 234 determines that the number of the feature amounts stored in the first state region 2351 does not reach the upper limit number M1 (NO in step S15). Thereafter, processing of steps S12 to S15 is repeated. Thereafter, the processing of the basic data acquisition phase is ended when the storage destination determination unit 234 determines that the number of the feature amounts stored in the first state region 2351 reaches the upper limit number M1 (YES in step S15). The processing of the actual operation phase can be executed after the processing of the basic data acquisition phase ends.

Figure 6:
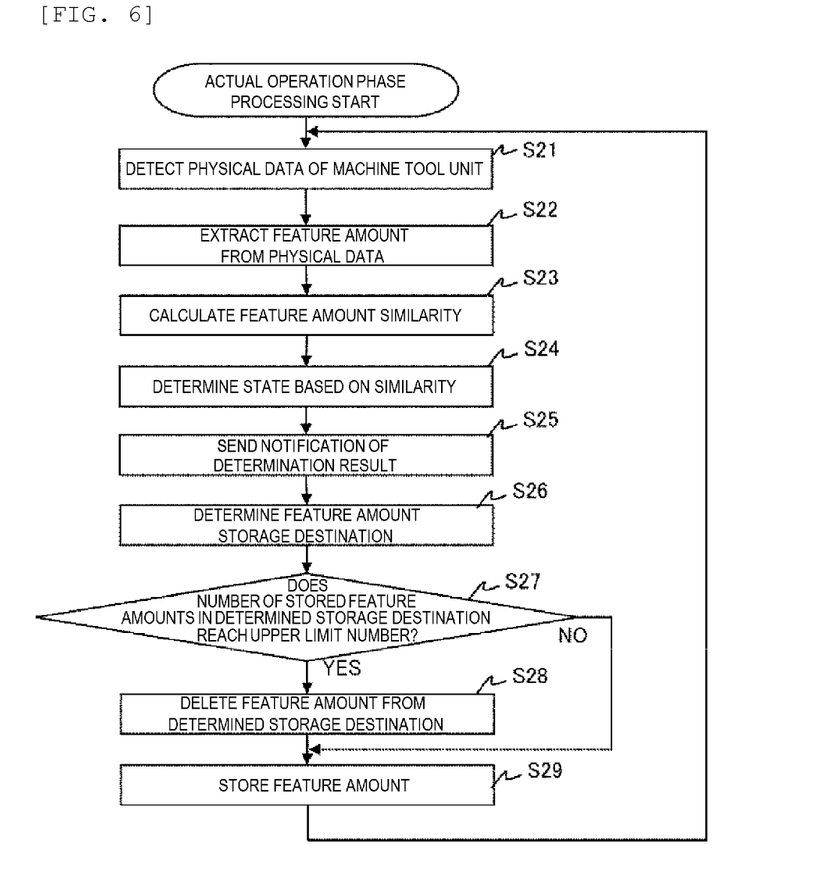
FIG. 6 is a flowchart showing an example of processing of an actual operation phase.

Next, FIG. 6 is a flowchart showing an example of the processing of the actual operation phase.

The processing of the actual operation phase is constantly and continuously executed when the mechanical device 20 is energized after execution of the processing of the basic data acquisition phase.

First, the sensor unit 22 detects the physical data of the machine tool unit 21 and outputs the detected physical data to the state identification unit 23 (step S21).

Next, the feature amount extraction unit 231 of the state identification unit 23 extracts the feature amount from the physical data input from the sensor unit 22, and outputs the extracted feature amount to the similarity calculation unit 232 and the storage destination determination unit 234 (step S22).

Next, the similarity calculation unit 232 calculates the similarity between the feature amount input from the feature amount extraction unit 231 and all feature amounts already stored in the feature amount storage unit 235, and outputs the calculated similarity to the state determination unit 233 (step S23).

However, feature amounts corresponding to the stop state are stored in the first state region 2351 up to the upper limit number M1, and no feature amount is stored in the second state region 2352 or the third state region 2353 immediately after the processing of the actual operation phase starts. Therefore, the similarity between the feature amount input from the feature amount extraction unit 231 and the feature amount corresponding to the stop state is calculated in step S23 immediately after the processing of the actual operation phase starts.

Next, the state determination unit 233 compares the calculated similarity with a predetermined threshold value set in advance, and determines whether the operation state of the mechanical device 20 is the stop state, the idle state, or the work state based on a comparison result (step S24).

Specifically, in a stage where only the feature amount corresponding to the stop state is stored in the feature amount storage unit 235, it is determined that the operation state is the stop state when the similarity between the feature amount corresponding to the stop state is equal to or larger than the predetermined threshold value. It is temporarily determined that the operation state is not the stop state when the similarity between the feature amount corresponding to the stop state is less than the predetermined threshold value. Normally, the machine tool unit 21 shifts to the work state after passing the idle state for a certain period of time. Therefore, it is determined that the operation state is the idle state until the number of times of temporary determination, which determines that the operation state is not the stop state, reaches the upper limit number M2.

When the number of times of temporary determination, which determines that the operation state is not the stop state, exceeds the upper limit number M2, upper limit number M1 pieces of feature amounts corresponding to the stop state and upper limit number M2 pieces of feature amounts corresponding to the idle state are stored in the feature amount storage unit 235. In this stage, if at least one of the similarity of the feature amounts corresponding to the stop state and the similarity of the feature amounts corresponding to the idle state is equal to or larger than the predetermined threshold value, the operation state is determined to be the operation state having higher similarity. When both the similarity of the feature amounts corresponding to the stop state and the similarity of the feature amounts corresponding to the idle state are less than the predetermined threshold value, the operation state is determined to be the work state.

In a stage where the feature amount corresponding to the stop state, the feature amount corresponding to the idle state, and the feature amount corresponding to the work state are stored in the feature amount storage unit 235, the operation state is determined to be the operation state having the largest similarity, regardless of the comparison result with the predetermined threshold value.

After determining the operation state of the mechanical device 20 as described above, the state determination unit 233 notifies the storage destination determination unit 234 of the determination result (step S25).

Next, the storage destination determination unit 234 determines a storage destination in the feature amount storage unit 235 for the feature amount input from the feature amount extraction unit 231 based on the determination result of the operation state of the state determination unit 233 (step S26). Specifically, when the stop state is determined, the storage destination is determined to be the first state region 2351; when the idle state is determined, the storage destination is determined to be the second state region 2352; and when the work state is determined, the storage destination is determined to be the third state region 2353.

Next, the storage destination determination unit 234 determines whether the number of feature amounts already stored in the feature amount storage destination determined in step S26 reaches an upper limit number (step S27). When it is determined that the upper limit number is reached (YES in step S27), the storage destination determination unit 234 sequentially selects and deletes a feature amount already stored in the determined storage destination (step S28). On the contrary, step S28 is skipped when the storage destination determination unit 234 determines that the number of the feature amounts already stored in the feature amount storage destination determined in step S26 does not reach the upper limit number (NO in step S27).

Next, the storage destination determination unit 234 stores the feature amount in the storage destination determined in step S26 (step S29). For example, when it is determined that the storage destination of the feature amount input from the feature amount extraction unit 231 is the first state region 2351, the storage destination determination unit 234 deletes a feature amount from the first state region 2351 since the upper limit number M1 pieces of feature amounts are already stored in the first state region 2351, and then stores the feature amount input from the feature amount extraction unit 231 in the first state region 2351.

Thereafter, the processing returns to step S21, and steps S21 to S29 are repeated. Then the processing of the actual operation phase is ended in response to a predetermined operation from the user.

According to the state identification processing described above, if upper limit number M1 pieces of feature amounts corresponding to the stop state are acquired and stored as the basic data in the basic data acquisition phase, then it is not only possible to identify whether the operation state is the stop state in the actual operation phase, but also possible to identify whether the operation state is the stop state, the idle state, or the work state.

Since the feature amount corresponding to the idle state and the feature amount corresponding to the work state can be acquired and stored in the actual operation phase, identification accuracy of the operation state can be gradually improved immediately after the end of the basic data acquisition phase.

Further, since different regions are provided in the feature amount storage unit 235 for each operation state and the upper limit number of the number of feature amounts stored in the feature amount storage unit 235 is provided, operation state deviation does not occur in the feature amounts stored in the feature amount storage unit 235. Therefore, operation state identification accuracy can be maintained at a high level even after the same operation state is continued for a long time.

<Modification>

In the processing of step S24 described above, in a stage where the feature amount corresponding to the stop state, the feature amount corresponding to the idle state and the feature amount corresponding to the work state are stored in the feature amount storage unit 235, the state determination unit 233 determines that the operation state is the operation state having the largest similarity, regardless of the comparison result with the predetermined threshold value.

As a modification, in this stage, the state determination unit 233 determines that noise has occurred in original physical data from which the feature amount is extracted and deletes the feature amount output to the storage destination determination unit 234 from the feature amount extraction unit 231, or determines that a fourth state (for example, when there are two types of work states) occurs and stores a feature amount in a fourth state region additionally provided in the feature amount storage unit 235 when all calculated similarities are less than the predetermined threshold value.

For example, when the number of consecutive times when all the calculated similarities are less than the predetermined threshold value is less than a predetermined number (for example, 5), the state determination unit 233 determines that noise has occurred in the original physical data from which the feature amount is extracted, and deletes the feature amount output from the feature amount extraction unit 231 to the storage destination determination unit 234. When the number of consecutive times when the all the calculated similarities are less than a predetermined threshold value is equal to or more than the predetermined number (for example, 5), the feature amount is stored in a special region additionally provided in the feature amount storage unit 235. However, the feature amount stored in the special region is not used for similarity calculation. When the number of feature amounts stored in the special region exceeds a predetermined number, a warning message or the like indicating that the fourth state is present may be output by the state determination unit 233, and may be notified to the production management device 40 via the communication unit 237 and the network 30. Thereafter, the operation state of the storage device 20 may be identified as one of the four types after the storage region number N of the parameter storage unit 236 is changed to 4 by an operation from the user.

<Second Configuration Example of State Identification Unit 23>

Figure 7:
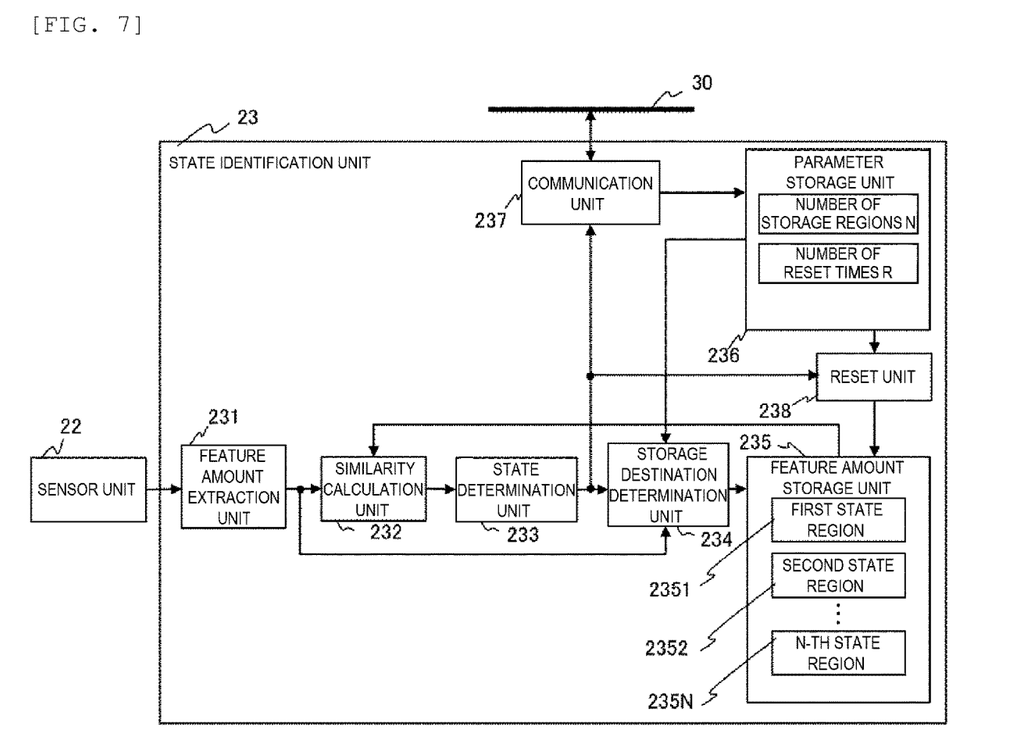
FIG. 7 is a block diagram showing a second configuration example of the state identification unit.

Next, FIG. 7 shows a second configuration example of the state identification unit 23.

In the second configuration example of the state identification unit 23, a reset unit 238 is added as compared with the first configuration example of the state identification unit 23 (FIG. 2), and a reset number R is additionally stored in the parameter storage unit 236. Among constituent elements of the second configuration example of the state identification unit 23, constituent elements common to those of the first configuration example are denoted by same reference numerals, and descriptions thereof are omitted as appropriate.

The reset unit (corresponding to the deletion unit of the invention) 238 acquires the reset number R stored in the parameter storage unit 236. The reset unit 238 acquires a determination result of the state determination unit 233. When the state determination unit 233 continuously determines that an operation state is a stop state for R (reset number) times, the reset unit 238 resets (deletes) feature amounts recorded in the second state region 2352 to an N-th state region 235N (N=3 in this case) and leaves only a feature amount stored in the first state region 2351 of the feature amount storage unit 235 (that is, basic data).

Figure 8:
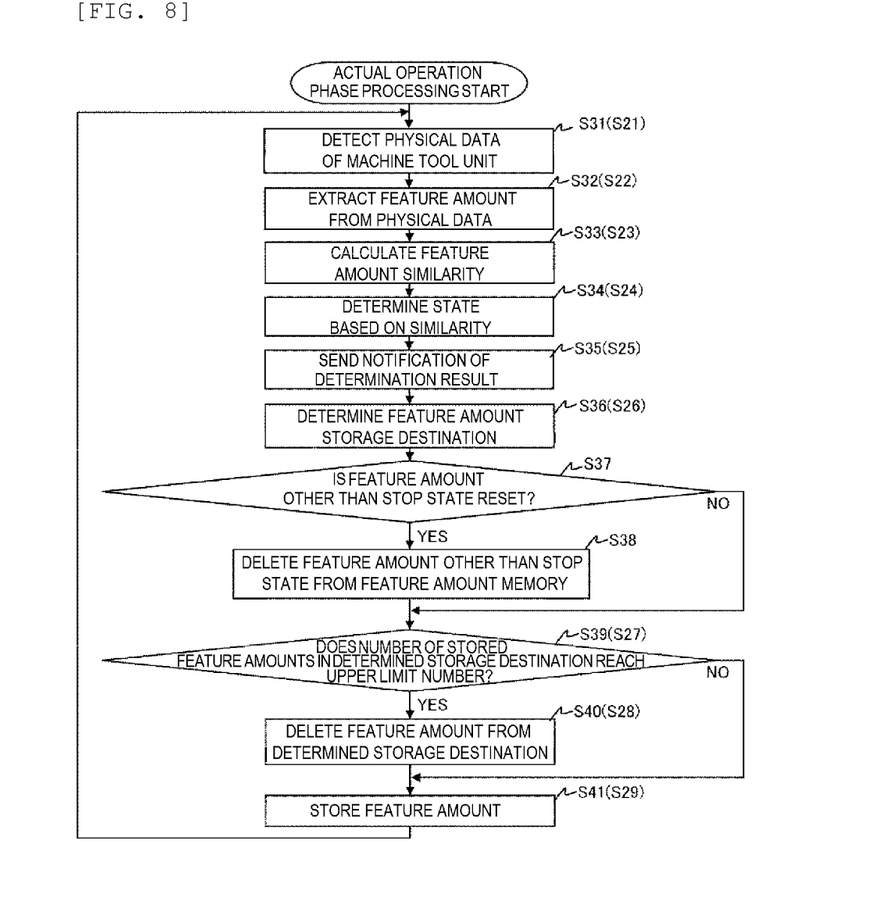
FIG. 8 is a flowchart showing an example of processing of an actual operation phase.

Next, FIG. 8 is a flowchart showing an example of processing of an actual operation phase corresponding to the second configuration example of the state identification unit 23. Hereinafter, the processing of the actual operation phase corresponding to the second configuration example of the state identification unit 23 is referred to as a second actual operation phase processing. The processing of the actual operation phase corresponding to the first configuration example of the state identification unit 23 (FIG. 6) is referred to as a first actual operation phase processing.

A basic data acquisition phase executed prior to the second actual operation phase processing is the same as the description above with reference to FIG. 5, and is therefore omitted.

Steps S31 to S36 of the second actual operation phase processing are the same as steps S21 to S26 of the first actual operation phase processing described above with reference to FIG. 6, and descriptions thereof are omitted.

After the storage destination determination unit 234 determines a storage destination in the feature amount storage unit 235 for a feature amount input from the feature amount extraction unit 231 in processing of step S36, the reset unit 238 determines whether to reset a feature amount stored in the feature amount storage unit 235 (step S37).

Specifically, the reset unit 238 determines to reset the feature amount when determination in the previous step S34 indicates the stop state while the number of consecutive times of the determination of the stop state reaches the reset number R. On the contrary, the reset unit 238 determines not to reset the feature amount when the determination in the previous step S34 does not indicate the stop state or the number of consecutive times of the determination of the stop state does not reach the reset number R.

When the reset unit 238 determines to reset the feature amount (YES in step S37), the feature amounts recorded in the second state region 2352 are reset to the N-th state region 235N (N=3 in this case), and only the feature amount stored in the first state region 2351 of the feature amount storage unit 235 is left (step S38). Thereafter, the processing proceeds to step S39.

On the contrary, the processing skips step S38 and proceeds to step S39 when the reset unit 238 determines not to reset the feature amount (NO in step S37).

Steps S39 to S41 are the same as steps S27 to S29 of the first actual operation phase processing described above with reference to FIG. 6, and descriptions thereof are omitted.

According to the second actual operation phase processing described above, a feature amount corresponding to an idle state or a work state can be reset, for example, when the machine tool unit 21 is brought into the stop state to change a specification of the machine tool unit 21 or to change processing conditions, and when the state is continued for a certain period of time. Accordingly, for example, state identification accuracy can be improved after changing the specification of the machine tool unit 21 or changing the processing conditions, as compared with a case where the feature amount is not reset.

The state identification unit 23 described above can be configured by hardware or can be realized by software. A program constituting the software is installed in a computer when the state identification unit 23 is realized by software. Here, the computer includes: the edge microcomputer described above; a computer incorporated in dedicated hardware; a general-purpose personal computer, for example, capable of executing various functions by installing various programs.

Figure 9:
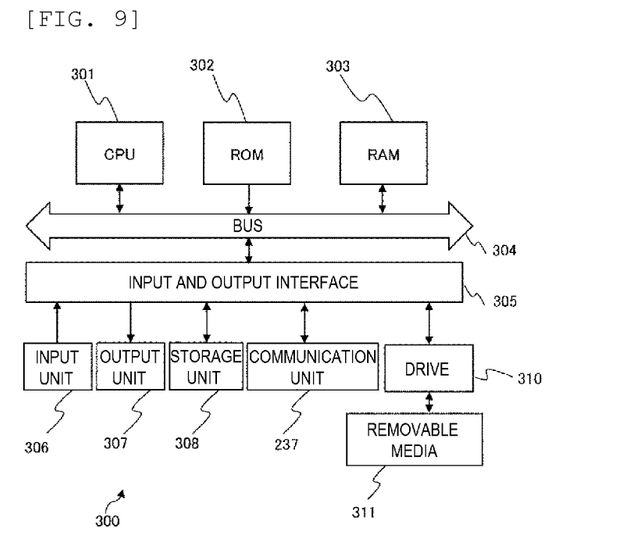
FIG. 9 is a block diagram showing a configuration example of a computer.

FIG. 9 is a block diagram showing a configuration example of hardware of a computer that realizes the state identification unit 23 by a program.

A central processing unit (CPU) 301, a read only memory (ROM) 302, and a random access memory (RAM) 303 are connected to each other via a bus 304 in the computer 300.

An input and output interface 305 is further connected to the bus 304. The sensor unit 22 (not shown), an input unit 306, an output unit 307, a storage unit 308, the communication unit 237, and a drive 310 are connected to the input and output interface 305.

The input unit 306 includes a keyboard, a mouse, a microphone, or the like. The output unit 307 includes a display, a speaker, or the like. The storage unit 308 includes a hard disc drive (HDD), a solid state drive (SSD), or the like, and stores various types of information. The storage unit 308 corresponds to the feature amount storage unit 235 and the parameter storage unit 236 of the state identification unit 23. The communication unit 237 includes an LAN interface or the like, and communicates with other devices via a network. The drive 310 drives a removable medium 311 such as a magnetic disk, an optical disk, a magneto-optical disk, or a semiconductor memory.

In the computer 300 configured as described above, the CPU 301, for example, loads a program stored in the storage unit 308 into the RAM 303 via the input and output interface 305 and the bus 304 and executes the program, thereby realizing the state identification unit 23.

The program executed by the computer 300 (the CPU 301) can be provided by being recorded in the removable medium 311 as a package medium or the like, for example. The program can be provided via a wired or wireless transmission medium such as a local area network, a communication network, or digital satellite broadcasting.

In the computer 300, the program can be installed in the storage unit 308 via the input and output interface 305 by attaching the removable medium 311 to the drive 310. The program can be received by the communication unit 237 via a wired or wireless transmission medium and installed in the storage unit 308. In addition, the program can be installed in advance in the ROM 302 or the storage unit 308.

The program executed by the computer 300 may be a program in which processing is performed in time series according to an order described in the present description, or may be a program in which processing is performed in parallel or at a necessary timing such as when a call is performed.

Effects described in the present description are merely examples and are not limited, and other effects may also be obtained.

The invention is not limited to the embodiment described above, and includes various modifications. For example, the embodiment described above has been described in detail for easy understanding of the invention, and the invention is not necessarily limited to including all the constituent elements described above. Further, a part of a configuration of an embodiment can be replaced with a configuration of another embodiment, and the configuration of the other embodiment can be added to the configuration of the embodiment. A part of the configuration of each embodiment may be added with another configuration, or be omitted or replaced.

A part or all of the above configurations, functions, processing units, processing methods, and the like may be realized by hardware, for example, through designing an integrated circuit. Each of the configurations, functions, and the like described above may be realized by software through interpreting and executing a program that realizes the respective functions by a processor. Information such as a program, a table, or a file that realizes each function can be stored in a storage device such as a memory, a hard disk or an SSD, or in a recording medium such as an IC card, an SD card, or a DVD. In addition, control lines and information lines shown are considered to be necessary for explanation, and all the control lines and information lines are not necessarily shown in a product. In practice, it may be considered that almost all the configurations are connected with each other.

The invention can not only be provided in forms such as a state identification device, a state identification method, and a mechanical device, but also in various forms such as a computer readable program.

REFERENCE SIGN LIST

10. Production Management System
20. Mechanical Device
21. Machine Tool Unit
22. Sensor Unit
23. State Identification Unit
30. Network
40. Production Management Device
231. Feature Amount Extraction Unit
232. Similarity Calculation Unit
233. State Determination Unit
234. Storage Destination Determination Unit
235. Feature Amount Storage Unit
236. Parameter Storage Unit
237. Communication Unit
238. Reset Unit
300. Computer
301. CPU
302. ROM
303. RAM
304. Bus
305. Input and output Interface
306. Input Unit
307. Output Unit
308. Storage Unit
310. Drive
311. Removable Medium

The invention claimed is:

1. A state identification device, comprising:
a memory;
an input/output device; and
a processor communicatively coupled to the memory and the input/output device, the processor configured to:
extract a feature amount from physical data of a tool which shifts to a plurality of operation states;
provide a region as a storage destination, in the memory, of the extracted feature amount for each of the plurality of operation states to which the tool shifts;
calculate a similarity between the extracted feature amount and a feature amount stored in the memory;
determine an operation state of the tool based on the calculated similarity; and
determine the region serving as the storage destination of the extracted feature amount based on a determination result.

2. The state identification device according to claim 1, wherein the processor is further configured to:
extract a feature amount from the physical data detected when the tool shifts to a stop state, and
store, in the memory, the feature amount extracted from the physical data detected when the tool shifts to the stop state as basic data in the region corresponding to the stop state.

3. The state identification device according to claim 2, the processor further configured to:
delete the feature amount other than the basic data from the memory.

4. The state identification device according to claim 3, wherein
the processor deletes the feature amount other than the basic data from the memory when the processor continuously determines for a predetermined number of times that the operation state of the tool is the stop state.

5. The state identification device according to claim 1, wherein
the tool shifts to at least one of three states, which include a stop state, an idle state, and a work state, as the operation state, and
the memory is provided with the region corresponding to each of the stop state, the idle state, and the work state.

6. The state identification device according to claim 1, wherein
the region provided in the memory corresponding to each of the plurality of operation states has an upper limit number for the feature amount to be stored, and
the processor erases only one stored feature amount and then stores the extracted feature amount when the upper limit number of pieces of the feature amount are stored in the region determined as the storage destination of the extracted feature amount.

7. The state identification device according to claim 6, wherein
the region provided in the memory corresponding to each of the plurality of operation states has the upper limit number differently.

8. The state identification device according to claim 1, wherein
the memory is provided with the region that does not correspond to any of the plurality of operation states, and
the memory stores the extracted feature amount in the region that does not correspond to any of the plurality of operation states when the operation state of the tool is not determined.

9. A state identification method of a state identification device, comprising:

extracting, via a processor, a feature amount from physical data of a tool which shifts to a plurality of operation states;
calculating, via the processor, a similarity between the extracted feature amount and a feature amount stored in a memory;
determining, via the processor, an operation state of the tool based on the calculated similarity; and
determining, via the processor, a region in the memory that serves as a storage destination of the extracted feature amount based on a determination result by determining the operation state, wherein
the memory is provided with a region that serves as a storage destination of the extracted feature amount for each of the plurality of operation states to which the tool shifts.

10. A mechanical device, comprising:
a tool that shifts to a plurality of operation states;
a sensor that detects physical data of the tool;
a processor that is communicatively coupled to the machine and the sensor, the processor configure to:
extracts a feature amount from the detected physical data;
provide a region as a storage destination of the extracted feature amount for each of the plurality of operation states to which the tool shifts;
calculate a similarity between the extracted feature amount and a feature amount stored in a memory;
determine an operation state of the tool based on the calculated similarity; and
determine the region serving as the storage destination of the extracted feature amount based on a determination result.

* * * * *